US011994308B2

(12) United States Patent
Harrod et al.

(10) Patent No.: US 11,994,308 B2
(45) Date of Patent: May 28, 2024

(54) MULTI-FACTOR FURNACE AND HEAT PUMP CONTROL SYSTEM

(71) Applicant: Johnson Controls Tyco IP Holdings LLP, Milwaukee, WI (US)

(72) Inventors: Gregory Ralph Harrod, Wichita, KS (US); Jeffrey Norris Nichols, Wichita, KS (US)

(73) Assignee: JOHNSON CONTROLS TYCO IP HOLDINGS LLP, Milwaukee, WI (US)

( * ) Notice: Subject to any disclaimer, the term of this patent is extended or adjusted under 35 U.S.C. 154(b) by 1085 days.

(21) Appl. No.: 16/807,849

(22) Filed: Mar. 3, 2020

(65) Prior Publication Data

US 2020/0214191 A1  Jul. 9, 2020

Related U.S. Application Data

(63) Continuation of application No. 12/342,252, filed on Dec. 23, 2008, now abandoned.

(60) Provisional application No. 61/017,383, filed on Dec. 28, 2007.

(51) Int. Cl.
| | |
|---|---|
| *F24F 11/49* | (2018.01) |
| *A01C 5/06* | (2006.01) |
| *F24F 11/30* | (2018.01) |
| *F24F 11/47* | (2018.01) |
| *G06Q 50/06* | (2012.01) |
| *F24F 110/12* | (2018.01) |

(52) U.S. Cl.
CPC .............. *F24F 11/49* (2018.01); *A01C 5/062* (2013.01); *A01C 5/066* (2013.01); *F24F 11/30* (2018.01); *F24F 11/47* (2018.01); *G06Q 50/06* (2013.01); *F24F 2110/12* (2018.01); *F24F 2221/34* (2013.01)

(58) Field of Classification Search
CPC .. F24F 11/30; F24F 11/47; F24F 11/49; F24F 2110/12; F24F 2221/34; G06Q 50/06
USPC ........................................................ 700/276
See application file for complete search history.

(56) References Cited

U.S. PATENT DOCUMENTS

| | | | | |
|---|---|---|---|---|
| 4,476,920 A | * | 10/1984 | Drucker | F25B 29/003 165/242 |
| 5,259,445 A | * | 11/1993 | Pratt | F24D 19/1039 165/242 |
| 5,289,362 A | * | 2/1994 | Liebl | G05D 23/1923 705/412 |
| 2005/0234597 A1 | * | 10/2005 | Harrod | F24F 11/86 700/278 |

(Continued)

OTHER PUBLICATIONS

Carrier "interface instruction" KHAIC0101AAA (Year: 1995).*

*Primary Examiner* — Chun Cao
(74) *Attorney, Agent, or Firm* — Foley & Lardner LLP

(57) ABSTRACT

A method for adjusting an economic balance point in a dual fuel HVAC system includes a furnace, a heat pump and a control system. The method comprises providing a control device having a preprogrammed algorithm for controlling the HVAC system, providing a communication path between the control device and at least one component of the HVAC system, and accessing current fuel cost data; determining an economic balance point temperature based on the current fuel cost data; and updating the economic balance point temperature in the preprogrammed algorithm to adjust an actual balance point of the HVAC system.

23 Claims, 6 Drawing Sheets

(56) References Cited

U.S. PATENT DOCUMENTS

2007/0044501 A1* 3/2007 Schnell .................... F24F 11/56
  62/331
2009/0125150 A1* 5/2009 Lifson ................... F24H 15/375
  700/278
2010/0070093 A1* 3/2010 Harrod ................. G05B 19/042
  700/278

* cited by examiner

MULTI-FACTOR FURNACE AND HEAT PUMP CONTROL SYSTEM

CROSS-REFERENCE TO RELATED APPLICATIONS

This application is a continuation of U.S. application Ser. No. 12/342,252, filed Dec. 23, 2008, which claims priority from and the benefit of U.S. Provisional Application No. 61/017,383 entitled METHOD AND APPARATUS FOR DYNAMIC BALANCE POINT SELECTION, filed Dec. 28, 2007, both of which are hereby incorporated by reference.

BACKGROUND

The application generally relates to control systems for heating ventilation and air conditioning (HVAC) systems. The application relates more specifically to a method and apparatus to dynamically determine a balance point of an HVAC system having a heat pump and a fossil fuel furnace.

The balance point of an HVAC system determines whether the heat pump or fossil fuel furnace is to be used for heating. Static balance point settings can be primarily based on exterior temperature readings, and on the existing utility rates at the time of the HVAC system installation.

Heat pumps may be installed with indoor air handlers having electric resistance heating elements as the auxiliary or supplemental heating source. However, the rising cost of electricity is causing more HVAC systems to be installed with a heat pump as the primary heating source and a fossil fuel furnace as the auxiliary heating source.

In existing air handler/electric heater installations, the evaporator coil is located in the airflow path before the electric resistance heating elements. However, in a fossil fuel furnace installation, the evaporator coil is located in the airflow path after the furnace heating section. Therefore, the furnace is not permitted to produce heat while the heat pump is also providing heat, because the heat produced by the furnace heating section would be transferred into the refrigerant through the indoor coil, causing the refrigerant pressure to increase. Adding more heat to the refrigerant may cause the refrigerant pressure to exceed a high-pressure limit of the system.

Current methods employ a balance point setting that is static. By static, what is meant is that once the balance point is calculated by the installer and applied to the system, the balance point is not updated during the life of the HVAC system, or the balance point is updated infrequently such as during service or maintenance calls. However, the cost of fossil fuel and electricity changes continuously. Therefore, the balance point setting does not necessarily reflect an optimized balance between fuel sources. Previous heat pump/fossil fuel HVAC systems include some means for setting the balance point for the system. This setting can be made with an accessory kit or fossil fuel kit, which includes an exterior thermostat. The control system electromechanical devices or electronic control board of the heat pump may also include means, such as a shunt jumper or DIP switch, for setting the balance point. Indoor room thermostats are now available with a balance point setting. In all of these methods for setting the balance point, a control device determines the exterior ambient temperature, compares the exterior ambient temperature with the balance point setting, and determines whether to operate the heat pump or the furnace. Other methods use room thermostats to control the switching between heat pump and furnace without monitoring exterior temperature.

SUMMARY

One embodiment relates to a method for adjusting a balance point temperature in a dual fuel HVAC system having a furnace, a heat pump and a control system, by monitoring operating costs for the furnace and the heat pump. The method includes accessing fuel cost data; determining a balance point temperature based on the fuel cost data; and updating the balance point temperature in a preprogrammed algorithm to adjust a balance setpoint of the HVAC system, the balance setpoint being the exterior temperature below which the HVAC system switches from the heat pump to the furnace as a heat source.

Another embodiment relates to an HVAC system comprising a furnace, a heat pump, a controller, and a communication path between the controller and at least one of the furnace and the heat pump. The controller is configured to access a remote database including a current fuel cost data and retrieve the current fuel cost data, determine a balance point temperature based on the current fuel cost data, and update a balance point temperature in a preprogrammed algorithm to adjust a balance setpoint of the HVAC system.

Another embodiment relates to a method for controlling energy use in a structure, the structure including a dual fuel HVAC system having a furnace, a heat pump and a control system. The method includes selecting an indoor temperature setpoint, a heat loss for the structure, and a heating capacity of the system; determining an application balance point exterior temperature below which the heat pump heating capacity is less than the rate of heat loss of structure, based on one or more of the selected indoor temperature, the heat loss for the structure, and the heating capacity of the system; determining an operating cost of the furnace; determining an operating cost for the heat pump; determining a balance point temperature based on a point of intersection of the heat pump operating costs and the furnace operating cost; comparing the application balance point temperature to a balance point temperature and generating a balance setpoint, the balance setpoint being selected as the greater value of the application balance point temperature and the balance point temperature; and monitoring system parameters periodically to determine whether a change in the balance setpoint has occurred as a result of changes in system parameters.

Embodiments disclosed herein provide an ability to determine a balance point that is based on current utility rates and to determine an optimal balance point based on a user preferred input and multiple sensor data, and to control a source of heat from one of a fossil fuel furnace and a heat pump.

DETAILED DESCRIPTION OF THE EXEMPLARY EMBODIMENTS

Figure 1:
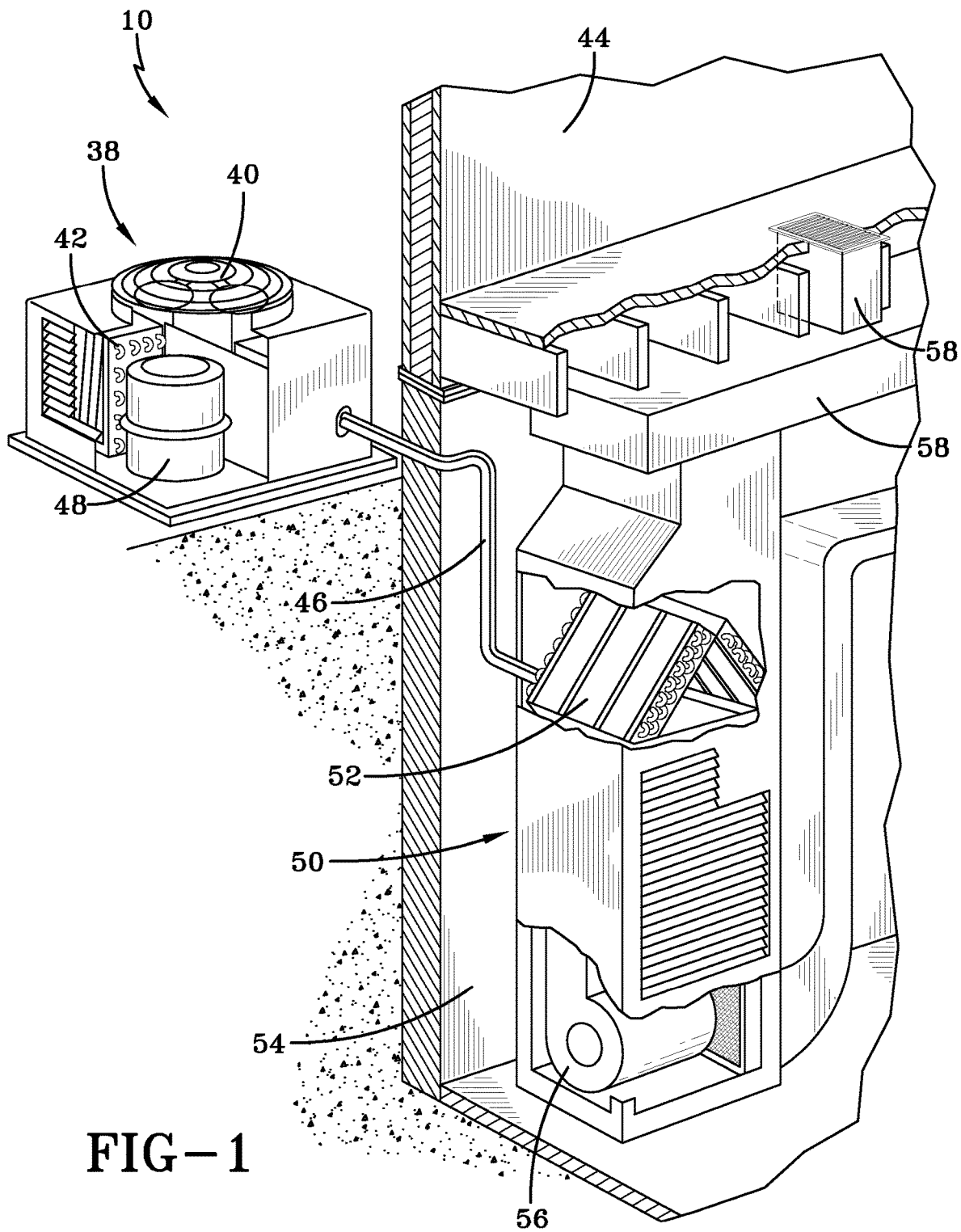
FIG. 1 illustrates an exemplary embodiment of an HVAC system for a typical residential structure.

Referring to FIG. 1, an exemplary environment for an HVAC system 10 for a residential setting is shown. HVAC system 10 may include an exterior unit 38 located outside of a structure 44 and an interior unit 50 located inside structure 44. Outdoor unit 38 may include a fan 40 that circulates air across coils 42 to exchange heat with refrigerant in coils 42 before the refrigerant enters structure 44 through lines 46. A compressor 48 may also be located in outdoor or exterior unit 38. Indoor unit 50 may include a heat exchanger 52 to provide cooling or heating to structure 44 depending on the operation of HVAC system 10. Indoor unit 50 may be located in a basement 54 of structure 44 or interior unit 50 may be disposed in any other suitable location such as in a first floor closet or in an attic (not shown) of structure 44. HVAC system 10 may include a blower 56 and air ducts 58 to distribute the conditioned air (either heated or cooled) through structure 44. A thermostat (not shown) or other control may be used to control and operate HVAC system 10.

Figure 2:
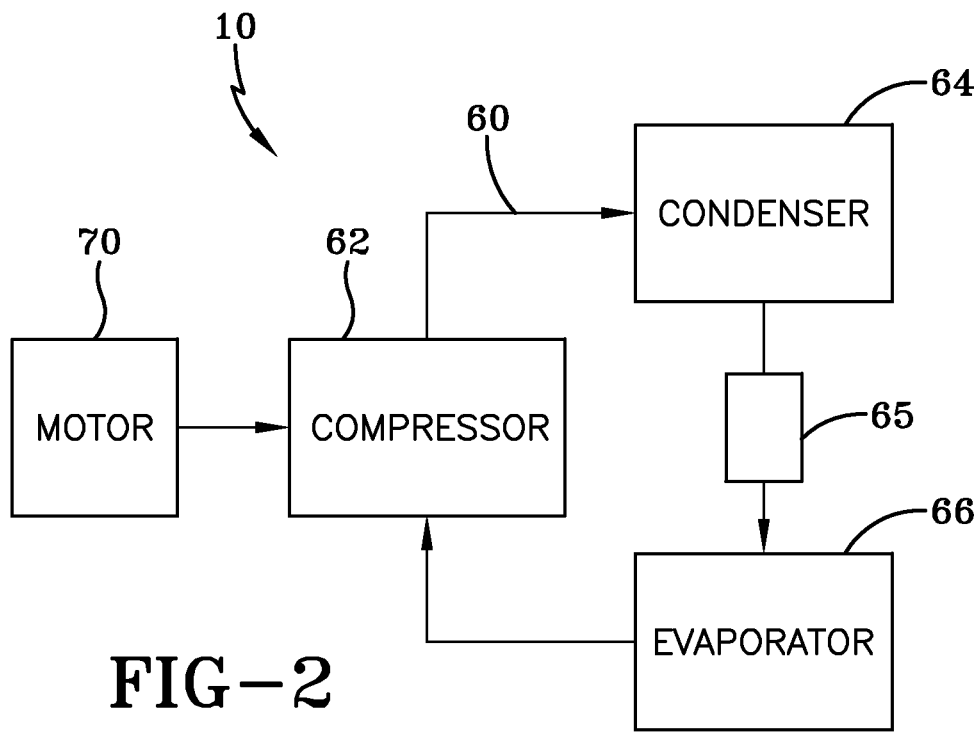
FIG. 2 illustrates schematically an exemplary embodiment of a vapor compression system.
Figure 3:
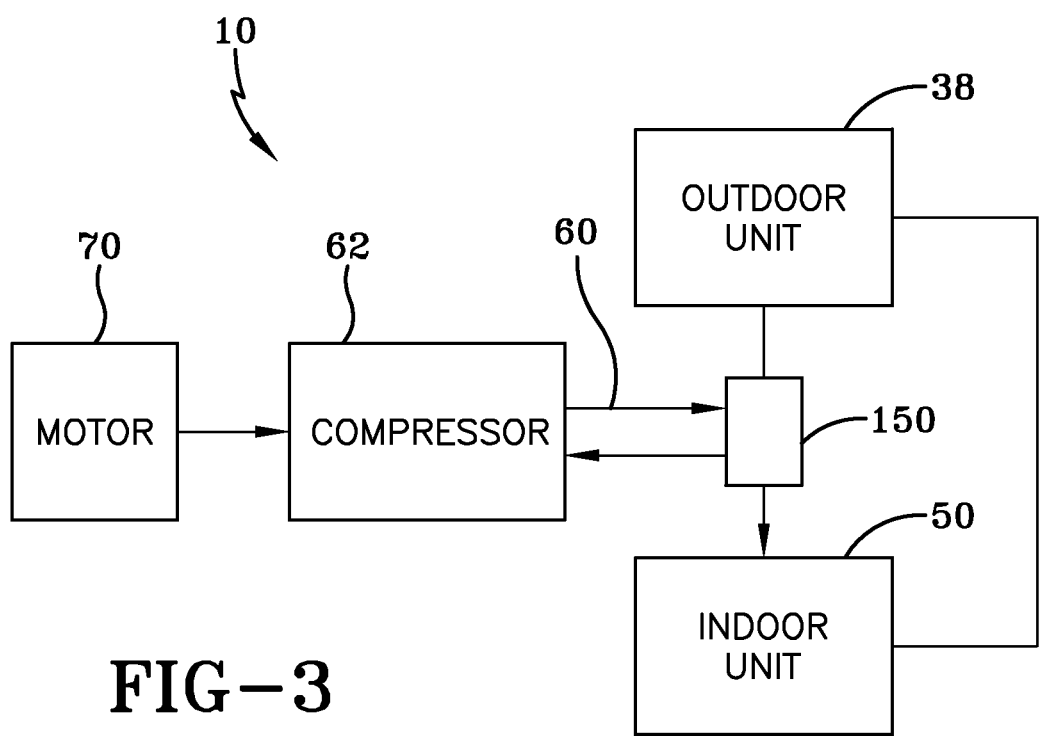
FIG. 3 illustrates schematically another exemplary embodiment of a vapor compression system.

Referring next to FIGS. 2 and 3, a vapor compression system 20 includes a compressor 62, a condenser 64, and an evaporator 66 (FIG. 2) or a compressor 62, a reversing valve 150, an indoor unit 50 and an exterior unit 38 (FIG. 3). System 20 can be operated as an air conditioning only system, where the evaporator 66 is located indoors, that is, as interior unit 50, to provide cooling to the interior air and condenser 64 is located exteriors, that is, as exterior unit 38, to discharge heat to the exterior air. System 20 can be operated as a heat pump with the inclusion of the reversing valve 150 to control and direct the flow of refrigerant from compressor 62. When system 20 is operated as a heat pump in an air conditioning mode, the reversing valve 150 is controlled for refrigerant flow as described with respect to FIG. 2. However, when system 20 is operated as a heat pump in heating mode, the flow of refrigerant is in the opposite direction from the air conditioning mode and condenser 64 is located indoors, that is, in interior unit 50, to provide heating of the indoor air and the evaporator 66 is preferably located outdoors, that is, as exterior unit 38, to absorb heat from the exterior air.

Compressor 62 compresses a refrigerant vapor and delivers the refrigerant vapor to condenser 64 through a discharge line 60, and the reversing valve 150 if operated as a heat pump. Compressor 62 can be a rotary compressor, screw compressor, reciprocating compressor, centrifugal compressor, swing link compressor, scroll compressor, turbine compressor, or any other suitable type of compressor. Refrigerant vapor is delivered by compressor 62 to condenser 64 and enters into a heat exchange relationship with a fluid, for example, air or water, and undergoes a phase change to a refrigerant liquid as a result of the heat exchange relationship with the fluid. Condensed liquid refrigerant from condenser 64 flows through an expansion device 65 to evaporator 66.

Condensed liquid refrigerant delivered to evaporator 66 enters into a heat exchange relationship with a fluid, for example, air or water, and undergoes a phase change to a refrigerant vapor as a result of the heat exchange relationship with the fluid. Vapor refrigerant exits evaporator 66 and returns to compressor 62 by a suction line to complete the cycle, and reversing valve 150 if operated as a heat pump.

Compressor 62 of system 20, whether operated as a heat pump or as an air conditioner, is driven by a motor 70. Motor 70 can be powered by a variable speed drive (VSD) or can be powered directly from an AC or DC power source. A VSD, if used, receives AC power having a particular fixed line voltage and fixed line frequency from AC power source and provides power to the motor 70. The motor 70 used in system 20 can be any suitable type of motor that can be powered by a VSD or directly from an AC or DC power source, for example, a switched reluctance (SR) motor, an induction motor, an electronically commutated permanent magnet motor (ECM).

For an HVAC system incorporating a heat pump and a fossil fuel furnace a determination is first made regarding the conditions that can cause the heat pump to operate, and the conditions that can cause the furnace to operate. The determination is made through a predetermined balance point setting. The balance point is defined by an exterior air temperature below which only the fossil fuel furnace can operate, and above which only the heat pump can operate. To determine the applicable balance point, a heat loss calculation is made of the residence or structure 44.

The application balance point as defined herein refers to the exterior temperature below which the heat pump heating capacity is less than the rate of heat loss of structure 44. When the exterior temperature is below the application balance point, structure 44 loses heat faster than system 10 can generate heat in heat pump mode, and the interior air temperature of structure 44 will decrease even when system 10 is operating at its full capacity. Traditionally, the heat loss of structure 44 is assumed to be linear and inversely proportional to the exterior temperature. A graphic representation of the heat loss (see FIG. 4) is a line created by connecting a point at a selected exterior temperature and a predetermined interior comfort temperature, for example, 70° F. The exterior design temperature depends on multiple factors, for example, residence structure type and location. At the predetermined interior comfort temperature, the exterior temperature and the interior temperature are identical. Therefore, there is no heat transfer between structure 44 and the exteriors. Thus, when the exterior temperature and the interior temperature equal the interior comfort temperature, HVAC system 10 does not require heating or cooling of the structure. Each structure or structure 44 has an associated heat loss curve that is determined as a part of the installation process.

System 20 heating capacity and energy consumption at various exterior temperatures may be determined during testing and development of a particular heat pump model or system. System 20 heating capacity decreases as the ambient temperature decreases. The system heating capacity curve is presumed to be linear and is determined based on the heating capacity of system 20 at two standard testing temperatures, 17° F. and 47° F. (see FIG. 4). The linear extrapolation for determining system 20 heating capacity for exterior temperatures other than the standard testing temperatures is adequate for calculating the balance point in most situations. However, the actual heating capacity curve of a heat pump may be nonlinear and thus may be represented by other methods, for example, by determining data at additional temperature points. Alternately, the actual heating capacity curve of heat pump or system 20 may be determined by representing the heating capacity of the heat pump system 20 using a mathematical model or equation. Each mathematical model of heat pump system 20 may be characterized by a heating capacity curve that is determined and documented during the development of the heat pump system.

At exterior temperatures above the application balance point, system 20 can produce more heat than is needed to maintain the interior temperature of structure 44. At exterior temperatures below the application balance point, system 20 cannot produce sufficient heat to maintain the temperature of structure 44 at a desired temperature setpoint, and the temperature within structure 44 will fall or be maintained below the desired setpoint, even though system 20 is operating at or near full capacity.

Figure 4:
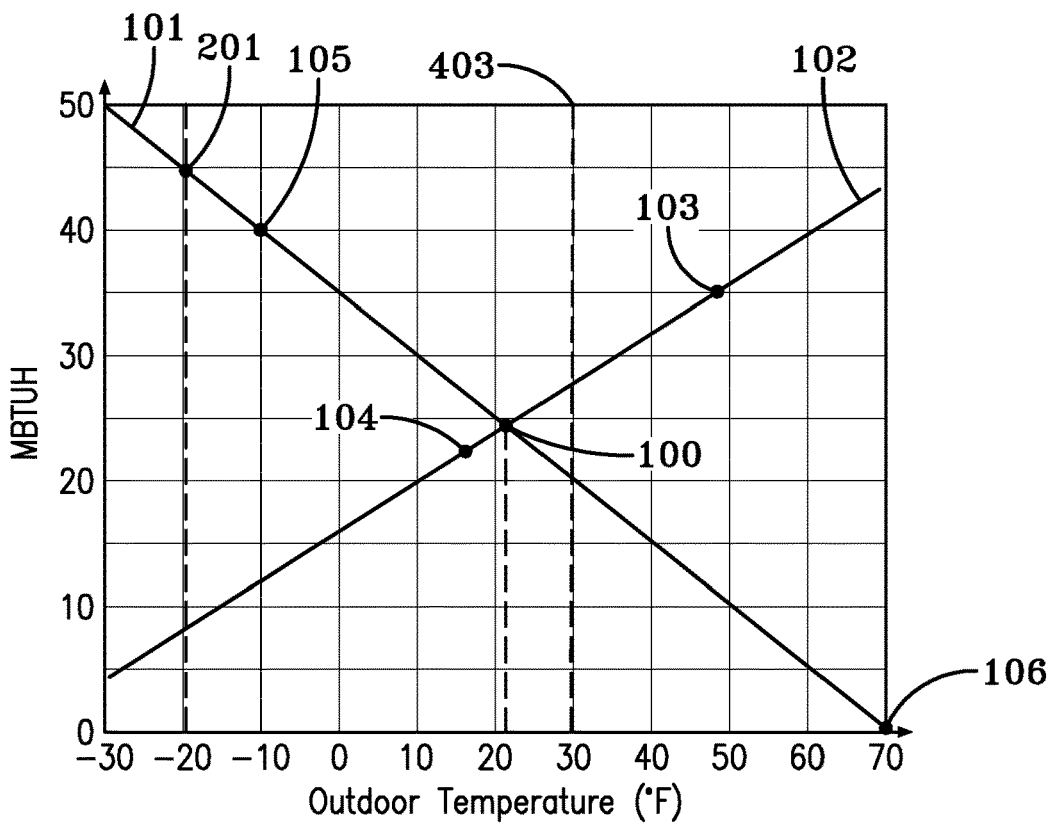
FIG. 4 is a graph illustrating design heat loss of an exemplary structure as a function of outdoor temperature.

Referring to FIG. 4, a design heat loss for an exemplary structure 44 is depicted by a line 101. The exterior design temperature in this example is a point 105 which shows an exterior design temperature of minus 10° F. (degrees Fahrenheit), at which structure 44 exhibits a heat loss of 40 million British Thermal Units per hour (MBTUH). The interior comfort temperature is represented by a point 106 which exhibits a heat loss of 0 MBTUH at 70° F. System 20 heating capacity is represented by line 102. In FIG. 4, line 102 is a straight line defined by connecting of test data points 103 and 104. Point 104 represents the heating capacity of system 20 when the exterior temperature is at or about 17° F. and point 103 represents the heating capacity of system 20 when the exterior temperature is at or about 47° F. An intersection point 100 depicts an application balance point of 22° F. for this exemplary system.

Figure 5:
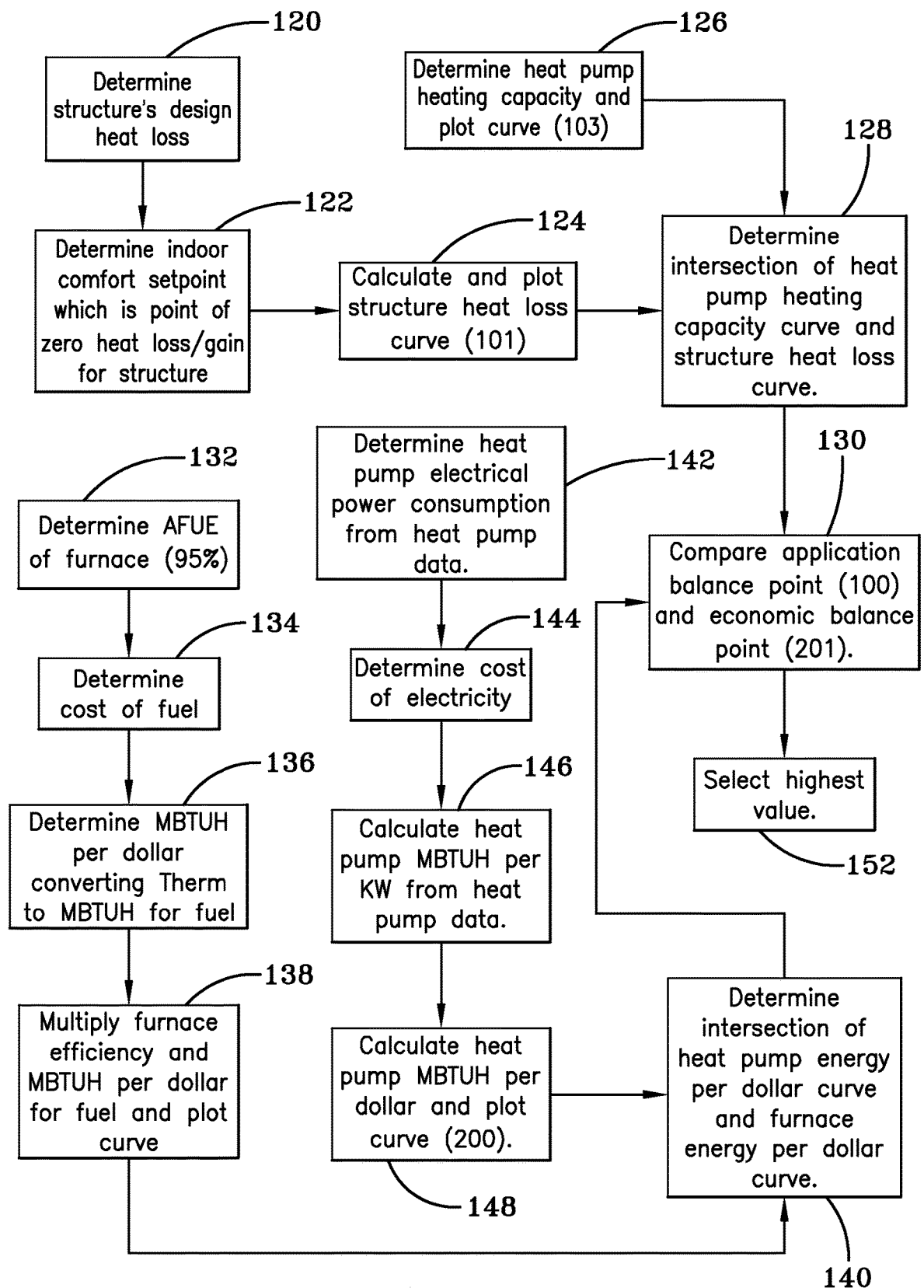
FIG. 5 is a flow chart of an exemplary process for determining an application balance point for an exemplary structure.

Referring next to FIG. 5, a flow diagram describes an exemplary process for determining an application balance point. First, at step 120, the design heat loss is determined. For example, in FIG. 4, the design heat loss is indicated by point 105, as being approximately 40 MBTUH at minus 10° F. At step 122, interior comfort setpoint 106 (FIG. 4) is determined, for example, 0 British Thermal Units per hour (BTUH) at 70° F. Next at step 124, heat loss is determined for structure 44, by line 101 connecting interior comfort setpoint 106 and design heat loss 105. At step 126, heating capacity of system 10 is determined and plotted as a curve 102 (FIG. 4). At step 128, the application balance point 100 is determined by the intersection of line 102 and line 101.

An economic balance point 201 (FIG. 6) is separately determined in FIG. 5, beginning at step 132, by determining an Annual Fuel Utilization Efficiency (AFUE) for the furnace. The system 10 proceeds to step 134 and step 136 to determine fuel cost, and optionally, any unit conversions that may be required, for example, Therm to MBTUH. At step 138, the furnace energy or operating cost is plotted in dollars as a function of AFUE, fuel cost and any required unit conversions.

At step 142, system 10 determines the electric power consumption of the heat pump, for example, by a map or profile of the heat pump. At step 144, system 10 determines the cost of electricity, and at step 146 calculates the heat output per unit of electricity, for example, MBTUH per KW.

Next, at step 148, the system calculates heat pump energy cost, or operating cost, for the particular heat pump used, at multiple exterior temperatures.

Next, at step 140 system 10 determines economic balance point 201 as the intersection of heat pump operating costs plotted in step 148 and furnace operating cost plotted in step 138.

At step 130, system 10 compares application balance point 100, determined in step 128, with economic balance point 201, determined in step 140, and generates a balance setpoint, or actual balance point 100, which is the higher value of application balance point 100 and application balance point 100, at step 152

Economic balance point 201 (see FIG. 6) is defined as the exterior temperature below which it is more economical to operate the fossil fuel furnace than it is to operate the heat pump. Economic balance point 201 is derived from the cost of electricity and the cost of fossil fuel, as well as system 10 energy consumption. System 10, when operated as a heat pump, is powered by electricity. The energy consumption of system 10 decreases as the exterior ambient temperature decreases, and the heating capacity of system 20 also decreases. Therefore, calculations for economic balance point 201 must be based on the amount of energy generated per dollar, for example, millions of BTUs per dollar. The energy consumption of a particular model of heat pump used in system 20 is determined during product development and testing. Energy consumption is measured at various, standard testing conditions and documented. The energy consumption curve is depicted as linear, but can be represented more accurately using additional data points or an equation for the curve. With a more accurate representation of the energy consumption curve and heating capacity curve, the economic balance point 201 may be more accurately calculated.

A fossil-fuel furnace burns gas to produce heat. This gas (natural gas or liquid propane) must be purchased by structure owner at some cost. To determine economic balance point 201, the amount of energy that the furnace can deliver (MBTUH) per dollar spent for the gas must be calculated. Furnace efficiencies may be based only on their efficiencies in combustion. Electrical energy consumption of the furnace to power the blower to distribute the air is not taken into account. However, it will be appreciated by those skilled in the art that electrical energy consumption of the furnace may be incorporated in the algorithms described in FIGS. 5 and 9, to further refine the economic and actual balance points. A furnace's heating capacity is considered to not vary with the exterior temperature. The heating capacity of the furnace is determined at the time of installation based on the exterior temperature design point. The heating capacity of the furnace must be sufficient to produce enough heat to maintain the interior temperature of structure 44 at the lowest expected exterior temperature without any heating assistance from the heat pump.

Figure 6:
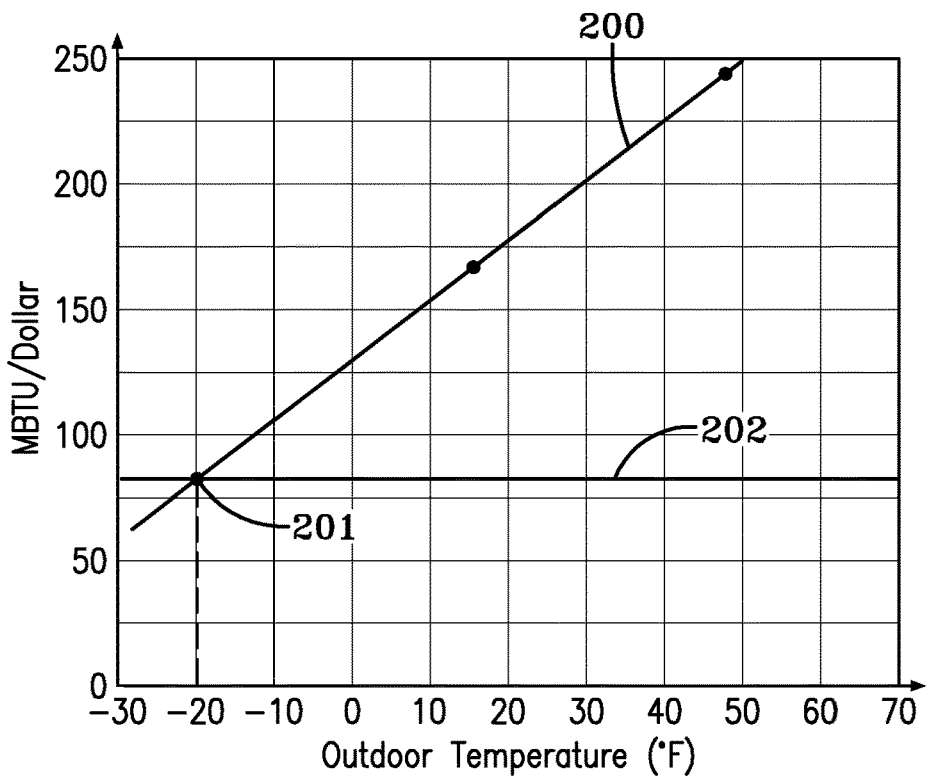
FIG. 6 is a graph illustrating an exemplary heat pump electrical consumption curve and an exemplary furnace heating cost curve.

Referring to FIG. 6, curve 200 represents the electrical energy per dollar of a heat pump. Curve 200 is linear and has been created by connecting two standard points of test data, the energy consumption per dollar at 17° F. and at 47° F.

Curve 202 represents the energy produced per dollar for a 95% efficient furnace given a gas cost of $1.086281/Therm. One Therm is equal to 100 MBTU. FIG. 6 depicts the process of determining the amount of energy produced per dollar using exemplary values.

Returning to FIG. 6, point 201, the economic balance point for this exemplary system, represents the intersection of heat pump electrical consumption curve 200 and furnace heating cost curve 202. For the given gas costs, electricity costs, heat pump heating performance, and furnace efficiency, economic balance point 201 is −20° F. In this system, it is most economical to operate the heat pump until the exterior temperature falls to −20° F. Because the heat pump cannot generate enough heat to maintain the desired interior temperature of structure 44 (FIG. 4), economic balance point 201 cannot be used as the actual balance point in this system. The higher of application balance point 100 and economic balance point 201 should be selected as described in FIG. 5. In this example, the actual balance point should be 22° F., the application balance point. Referring again to FIG. 4, the economic balance point 201 is shown along with application balance point 100. The actual balance point is the higher of the two temperature values, application balance point 100.

The actual balance point setting is typically the higher of the application balance point and the economic balance point. This embodiment allows either the heat pump or the furnace to independently maintain the desired temperature of structure 44. However, in another embodiment, the economic balance point may be lower than the application balance point and the actual balance point may be selected to be the economic balance point. In the latter embodiment, that is, where the application balance point is selected to be the economic balance point, when the exterior temperature is above the economic balance point but below the application balance point, the heat pump will try to heat structure 44 but will be unable to offset the heat loss of structure 44. A two-stage room thermostat will then call for auxiliary heating to be energized. Through control logic built into the software or hardware of system 20, which software or hardware may include a room thermostat, a heat pump controller, a fossil fuel kit, etc.—the heat pump is de-energized and the furnace energized. The furnace then operates exclusively, until the demand for auxiliary heat from the room thermostat is satisfied. Once the room thermostat is satisfied, the control system will return to heating the room using the heat pump. This cycle will control the temperature at the desired setpoint as long as the exterior temperature remains between the application balance point and the economic balance point, that is, the scenario in which the actual balance point is lower than the application balance point. Structure 44 will remain comfortable, but the HVAC heating system will not cycle off.

The factors that may be taken into account in selecting the application balance point include heat loss of the structure, exterior design temperature, interior comfort condition, and heating capacity of system 20 when operated in heat pump mode. The heat loss of the structure varies with exterior temperature and physical characteristics of the structure, and heating capacity of system 20 varies with exterior temperature and equipment operational mode. Factors that may be taken into account in selecting the economic balance point include fossil fuel cost, electrical energy cost, and energy consumption of system 20 when operated in heat pump mode. The electrical energy consumption of system 20 in heat pump mode varies with exterior temperature and equipment operational mode.

Figure 7:
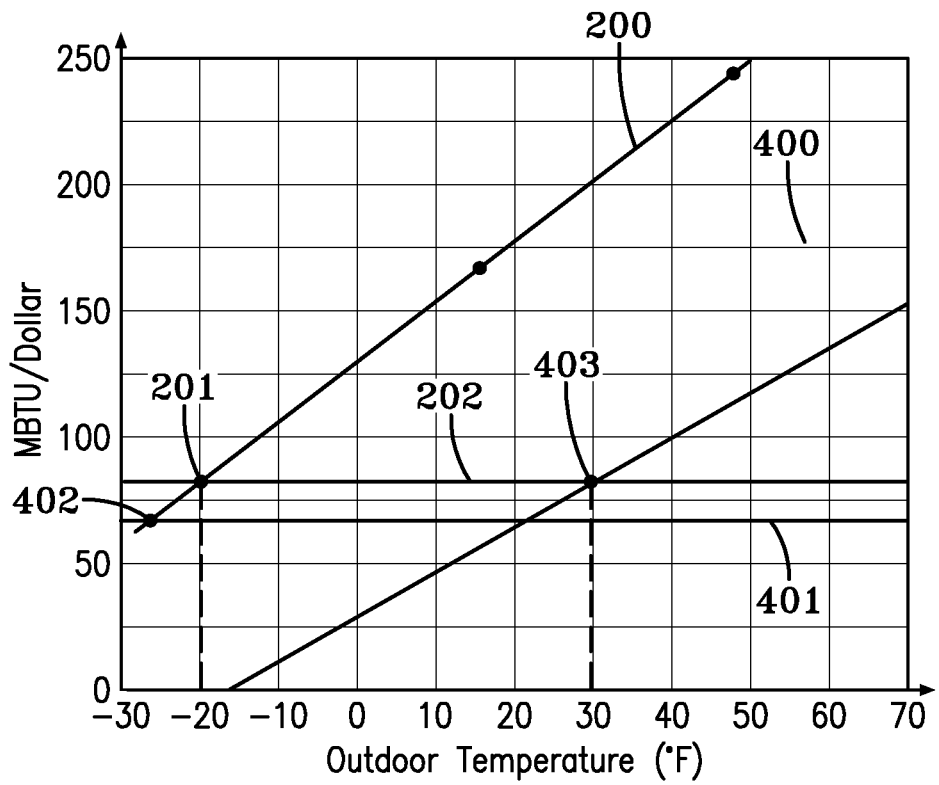
FIG. 7 is a graph illustrating a shift in the economic balance point shown in FIG. 6 due to changing characteristics of the furnace or heat pump.

Referring to FIG. 7, if the efficiency of the furnace in system 20 decreased, and/or if the cost of gas increased, the furnace would be less economical to operate. Curve 202 would shift and economic balance point 403 would occur at a lower temperature due to a new intersection point with curve 200. In the exemplary embodiment shown in FIG. 7, a new economic balance point 402 occurs at −28° F. The change in economic balance point 403 to economic balance point 402 would not result in a change of the actual balance point.

In another example, should the heating efficiency of system 20 heat pump decrease or the cost of electricity increase, curve 200 would move down the temperature scale, since system 20 would require more energy and cost in heat pump mode in order to generate approximately the same quantity of heat. If the furnace conditions remained the same, the economic balance point 402 would increase. Economic balance point 403, located at 30° F., occurs at a higher temperature than application balance point 100, which occurs at 22° F. Therefore, new actual balance point 403 would occur at 30° F.

If the heat pump heating capacity changes through the use of a multi-stage or fully variable capacity system, the application balance point also changes. In a typical two-stage heat pump system the heating capacity of system 20 can be reduced to 67% or 50% when operating in single stage compressor mode compared to full capacity compressor mode. A heat pump with a fully variable speed compressor can vary the heating capacity with a high degree of resolution between the minimum and maximum heating capacity. Although not represented in a figure, the electrical power consumption of the heat pump varies along with the heating capacity and the economic balance point calculation is also affected.

Figure 8:
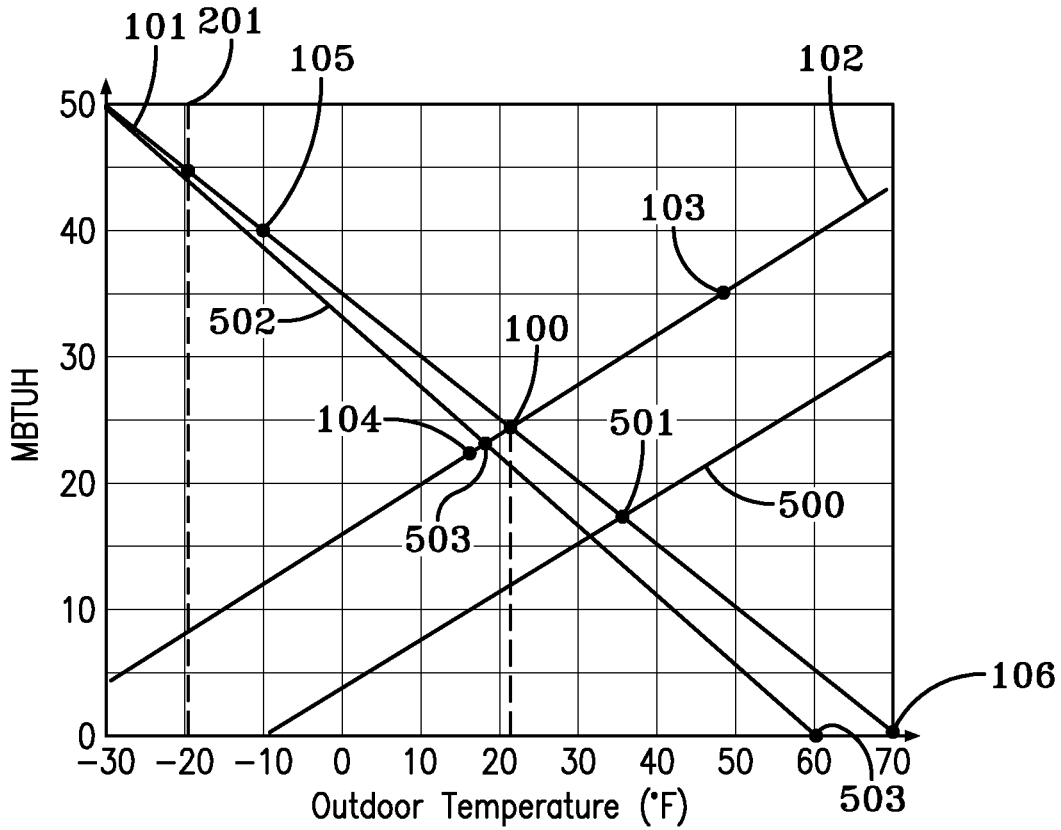
FIG. 8 shows an alternate embodiment of a heating capacity curve representing a heating capacity of and HVAC system operating the heat pump at less than maximum capacity FIG. 9 discloses an exemplary embodiment of a logic process to continually or periodically monitor system parameters

FIG. 8 shows an additional heating capacity curve 500 that represents the heating capacity of the system 20 operating as a heat pump at less than maximum capacity. The lower heating capacity causes the intersection of heating capacity curve 500 with structure heat loss curve 101 to change from point 100 to point 501. Thus, the application balance point has also changed or shifted to 36° F., as indicated by point 501.

Similarly, heat loss curve 101 may also change. For example, if the user selects an interior comfort setpoint change that is lower than 70° F., for example, 65° F., the structure heat loss curve will change. Or, if the construction or physical characteristics of the structure change, heat loss curve 101 may change. If heat loss curve 101 changes, application balance point 100 will change accordingly.

FIG. 8 shows that the interior comfort setpoint has changed from 70° F. to 60° F. As a result structure heat loss curve 101 has changed to a new heat loss curve represented by curve 502 and application balance point 100 has changed from 22° F. to 18° F. as indicated by a second application balance point 503. Varying the interior comfort setpoint may in some situations change application balance point 100, 503, and change the actual balance point depending on the current economic balance point.

An exemplary embodiment relates to a method of specifying a balance point by continuously monitoring the operating costs and determining the current economic balance point for the system based on the monitored operating costs. The method also includes continuously monitoring capacity and performance to determine the current application balance point. The method further includes continually comparing the economic and application balance points to determine the optimum actual balance point and then apply the optimum actual balance point to system 20 operation.

HVAC system 10 includes a control device with a pre-programmed algorithm (See, for example, FIGS. 5 & 9), which incorporates various system data and controls the components of the system 20. The control device can be a microprocessor-based electronic controller to implement the algorithm, receive input values and generate output signals.

In one embodiment, the disclosure includes a networked HVAC system 20. The network may be configured as a wired or wireless network, or a combination thereof. A heat pump controller, furnace controller, room thermostat, an independent control panel, a personal computer (PC), and other components of the HVAC system are in communication with one another through the network. Since data and control commands are transmitted freely throughout the network, the control algorithm may be programmed into any of the HVAC system components. In an alternate embodiment standard, non-networked HVAC controls are connected through thermostat wires with only one of the devices receiving the data to process the algorithm.

The present application contemplates methods, systems and program products on any machine-readable media for accomplishing its operations. The embodiments of the present application may be implemented using an existing computer processors, or by a special purpose computer processor for an appropriate system, incorporated for this or another purpose or by a hardwired system.

As noted above, embodiments within the scope of the present application include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

In many structures 44, Internet access is available through a local personal computer (PC). A wired or wireless network (not shown) may also be available. HVAC system 10 network described above may be incorporated as a part of structure 44 network. Preferably, however, HVAC system 10 will be part of a separate network that may be connected to a second network in structure 44 through a gateway or network coupling device (not shown).

Figure 9:
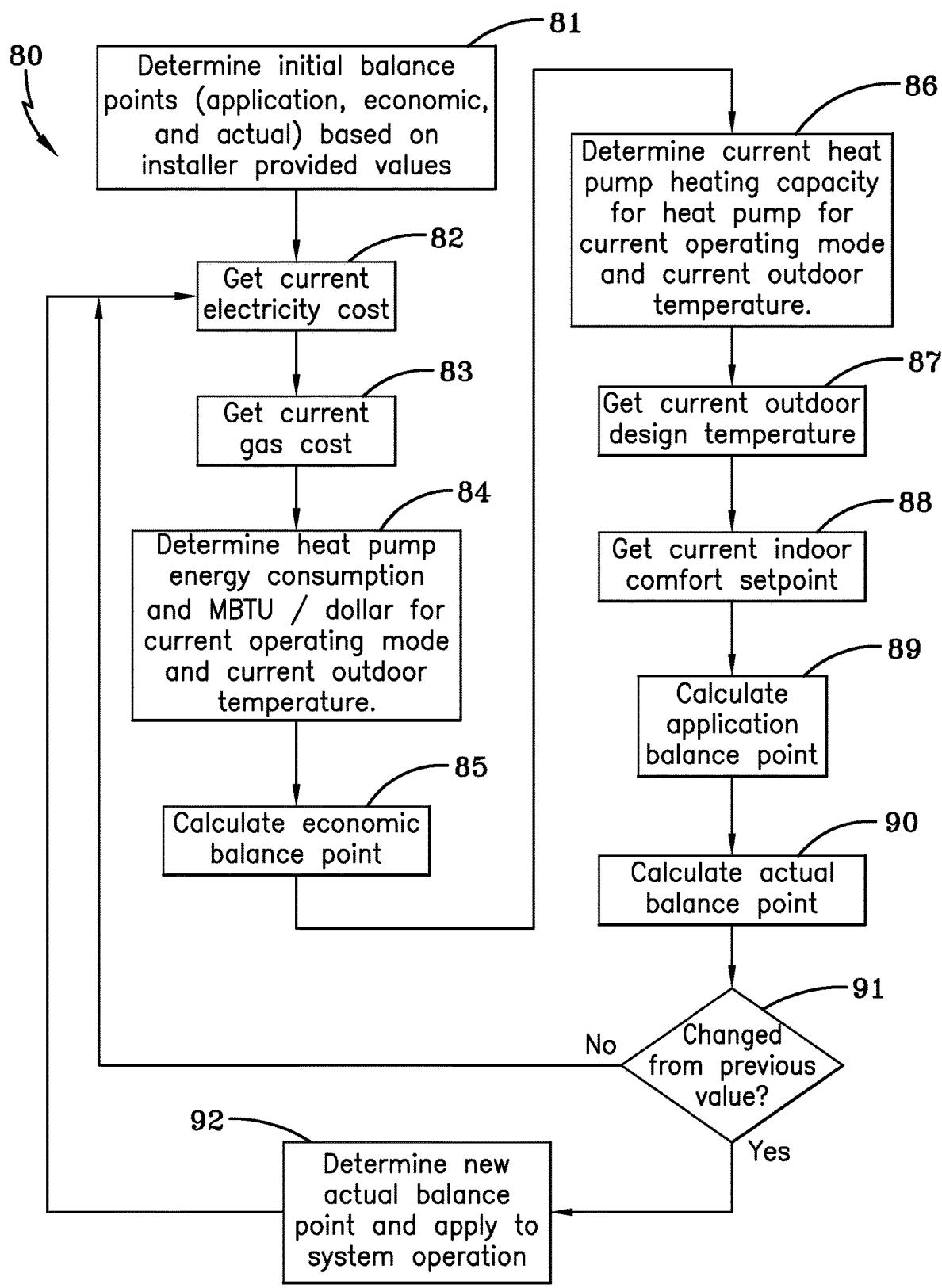

FIG. 9 discloses an exemplary embodiment of a control or logic process 80 for system 10 to continually or periodically monitor system 10 parameters. System parameters may change over time and cause actual balance point 100 to change. System 10 may monitor the parameters described above, either continually or periodically at predetermined intervals. Using the methods described above (see FIG. 5), at step 81 system 10 determines economic balance point 201 and application balance point 100 based on the current conditions present in system 10. System 10 determines actual balance point 100 based on economic balance point 201 and application balance point 100. Once the initial balance points are determined in step 81, system 10 proceeds to step 82, and obtains current electricity cost, and in step 83, current natural gas cost. Any other relevant fuel source or utility may be obtained as well. At step 84, system 10 determines a current energy consumption and cost and at step 85, computes economic balance point 201. System 10 proceeds to step 86 to determine current heat pump capacity. At step 87, system 10 obtains exterior design temperature, and at step 88, obtains an interior comfort setpoint. At step 89, system 10 computes application balance point 100, and at step 90 calculates actual balance point 100. At step 91, system 10 compares a newly calculated actual balance point 100 to previous actual balance point 100 and determines if actual balance point 100 has changed. If actual balance point 100 has changed, system 10 applies the new actual balance point 100 to operate system 10, at step 92, and returns to step 82. Otherwise, system 10 returns directly to step 82.

System 10 may apply methods which are well known, to transition to the new actual balance point setting. Such transition methods include waiting until system 10 is not operating, that is, there is no thermostat call for heating or cooling, to make the change; forcing system 10 to "Off" mode to make the change and re-starting system 10; and applying predetermined rules specified by the manufacturer, installer, or structure owner.

System 20 heating capacity in heat pump mode, and energy consumption of system 20 at various exterior temperatures, are determined during testing and development of a specific heat pump. In one embodiment one or more heat pump algorithms for continually determining actual heat pump performance and efficiency, which are known in the art, may be applied or incorporated into the algorithms set forth in steps 84 and 86, to dynamically calculate the application balance point.

In another embodiment, performance data for the heat pump may be stored in the memory of the heat pump controller during production of the heat pump. The stored performance data is used by the heat pump controller in steps 84 and 86 if the dynamic balance point algorithm is implemented in the heat pump control. Alternately, if the algorithm is implemented by another controller device on the network, the heat pump controller is configured to transmit or transfer the performance data to that other control device when the performance data is installed on the HVAC network during installation of the HVAC system.

The respective electrical and gas or fuel oil utility companies determine electricity rates and fossil fuel rates. Current energy cost information may be transferred in a variety of ways to a control device that implements the algorithm. In one embodiment, an HVAC network is in communication with or is a node on structure 44 network having access to the Internet. Therefore, the control device can access the rate information provided by the applicable utility company via the utility company websites. Utility companies currently provide a variety of communication channels to communicate with HVAC devices, for example, thermostats and temperature controls, for purposes such as load shedding and load monitoring. These communication channels can also be used for acquiring the utility rate information. Methods will vary with each utility provider and geographical area, as will be readily appreciated by persons skilled in the art.

For installations in which real time utility rate information is unavailable—for example, because there is no Internet connection associated with the network to which the control device is connected, or the utility companies do not make the rate information available, another embodiment is disclosed.

In this embodiment, a user may enter utility rate information manually. Users may obtain rate information through various means, for example, a monthly utility bill, an Internet source, a utility company hotline, etc. User may enter the rate information at predetermined intervals, for example, monthly, or on an ad hoc basis as needed. For example, the user may update the information only when rates change or monthly when they receive their utility bill. The interface with the HVAC network could be any of a variety of methods including through PC software, room thermostat menus, cell phone/PDA software, etc. Network interfaces may include features that prompt the user to input the information at a predetermined or specified interval. Manually entering the utility rate information is less precise compared with automatically updating the rate information from the Internet, the manual entry of rate information provides more accurate information than traditional HVAC installations. Additionally, some users may prefer manual entry of rate information so that they have control over how the system is functioning.

Heat loss curve 101 for the structure 44 is entered into the control device when the system is first installed, and updated as needed, for example, when significant changes are made to structure 44 such as major remodeling, or more efficient windows or doors are installed. Heat loss information may be entered into the HVAC system controller in a variety of ways, for example, thermostat menus, service tools, control panel interface, cell phone, and PC software. Since the standard method assumes a straight line representing the heat loss of the structure (see, for example, FIG. 4), only two points are required. However, more accurate techniques could include the use of an algorithm in the control device that determines the actual heat loss of the structure over the temperature range.

System 10 provides a dynamic interior comfort temperature. Instead of using a heat loss curve calculated only at the time of installation using one interior comfort temperature, system 10 can recalculate heat loss curve 101 as the interior comfort temperature changes. System 10 applies the available information based on the input of the user by continuously recalculating linear heat loss curve 101 as a function of the current interior temperature setpoint.

Initially the user enters one interior comfort temperature to establish an initial linear heat loss curve. For instance, the interior comfort temperature might initially be set at 70° F. Generally, however, the interior comfort temperature is not constant in actual operation. The interior comfort temperature is the temperature setpoint of the room thermostat. Therefore, the interior comfort temperature changes based on, for example, a programmable thermostat that changes automatically with the time of day, or if the structure 44 is occupied or unoccupied, or that is manually overridden based on the preference of the user. In one embodiment, the invention provides the ability to automatically recalculate heat loss curve 101 based on changes in the interior comfort temperature. The system also recalculates actual balance point 100, since actual balance point selection is based on heat loss curve 101.

Other, more elaborate methods may be incorporated into the system algorithm to dynamically determine the actual heat loss of the structure by applying data acquired through additional sensors or information derived from the analysis of room temperature, time, or similar parameters.

Additionally, because heat loss curve of structure 44 is, in reality, non-linear, in another embodiment a non-linear curve may be calculated which more accurately represents the actual heat loss of structure 44.

The greater value of the application balance point or economic balance point is typically selected as the controlling parameter of the system. However, in another exemplary embodiment, a balance point may be selected that is below the application balance point or above both the economic and application balance points. When an actual balance point is selected that is below the application balance point, the heat pump and furnace operate alternately while the exterior temperature remains above the selected balance point and below the application balance point. One advantage of selecting a balance point that is below the application balance point is that the long run times maintain the interior temperature more constant, as opposed to the situation where a the application balance point is below the balance point, which causes the interior temperature to drop when the system cuts off, and to spike when the system is turned on again. In some installations users may prefer to operate the furnace at temperatures above the application or economic balance point. Their decision may be based on perceived comfort as described below or simply a matter of personal preference.

The control device may optionally include selection elements to allow the user to specify which method of operation is desired, or to set a specific static setpoint and override the control algorithm.

Additionally, the control device may provide the ability for the user to specify conditional operational parameters. For instance, some individuals do not like feel of cooler air temperatures at the duct registers in a heat pump system. Discharge air temperature of a fossil fuel furnace is typically higher than that of a heat pump. Both types of heat are capable of heating the structure, but the cooler discharge air may be perceived by some users as uncomfortably cold. However, when heat pump heating is cheaper than fossil fuel heating, many users select financial savings over comfort. Given these alternate user preferences, system 20 allows the user to select or program the operating parameters in financial terms. For instance, the user might select heat pump operation below 20° F. only when it will result in a predetermined level of cost saving.

System 10 may optionally permit the user to specify a minimum duct register air temperature, by incorporating in the control system an additional sensor or algorithm that senses or calculates the air temperature of the duct register. The user interface would permit the user to display the economic impact so they could decide the level of comfort versus cost savings they are willing to trade. The user interface and controller are configurable to display the economic impact data based on time intervals of monthly, bi-monthly, seasonally, or annually.

The heat loss of structure 44 and the heat pump heating capacity also change over time. Such changes are gradual when compared with the fluctuations in fuel costs and the other time variable factors. In an alternate embodiment, structural heat loss and the heating capacity of the heat pump are factors that are monitored by the control system through appropriate sensing devices, and are incorporated into the control system/control algorithm to further adjust the application balance point.

While only certain features and embodiments of the invention have been shown and described, many modifications and changes may occur to those skilled in the art (e.g., variations in sizes, dimensions, structures, shapes and proportions of the various elements, values of parameters (for example, temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (that is, those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

What is claimed is:

1. A method of adjusting a balance point temperature for a heating, ventilation, and air conditioning (HVAC) system comprising a furnace, a heat pump, and a control system, the method comprising:
receiving, by the control system, cost data for at least one of electricity to operate the heat pump or fuel to operate the furnace;
determining, by the control system, an economic balance point temperature based on the cost data;
calculating, by the control system, an application balance point temperature below which a heating capacity of the heat pump is less than a rate of heat loss of a structure; wherein,
the application balance point temperature is calculated based on correlating heat loss trend data and heat capacity trend data;
receiving, by the control system, user input indicative of a selected balance between comfort and financial savings; and
selecting, by the control system, between operation of the furnace and the heat pump based on the user input, the economic balance point temperature, and the application balance point temperature.

2. The method of claim 1, further comprising determining, by the control system, an actual balance point temperature based on the economic balance point temperature, the application balance point temperature, and the user input;
wherein selecting, by the control system, between operation of the furnace and the heat pump is based on the actual balance point temperature.

3. The method of claim 1, further comprising receiving, by the control system, a user temperature setpoint for a space heated by the heat pump and the furnace;
wherein determining, by the control system, the application balance point temperature is based on the user temperature setpoint.

4. The method of claim 1, further comprising:
receiving, by the control system, a static balance point and an indication to override a selection algorithm for selecting operation of the furnace and the heat pump; and
selecting, by the control system, between operation of the furnace and the heat pump based on the static balance point in response to a determination that the indication to override the selection algorithm is received.

5. The method of claim 1, further comprising:
comparing, by the control system, the economic balance point temperature to the application balance point temperature;
selecting, by the control system, between operation of the furnace and the heat pump based on the economic balance point temperature and not based on the application balance point temperature in response to a first determination that the economic balance point temperature is greater than the application balance point temperature; and
selecting, by the control system, between operation of the furnace and the heat pump based on the application balance point temperature and not based on the economic balance point temperature in response to a second determination that the application balance point temperature is greater than the economic balance point temperature.

6. The method of claim 1, wherein the user input defines a conditional rule comprising one or more parameters;
wherein selecting, by the control system, between operation of the furnace and the heat pump comprises:
determining whether the conditional rule is triggered; and
selecting between operation of the furnace and the heat pump based on the conditional rule being triggered.

7. The method of claim 6, wherein the one or more parameters are a plurality of parameters comprising:
a first parameter indicating a cost savings of operating the heat pump compared to operating the furnace;
a second parameter indicating a cost savings threshold;
a third parameter indicating an outdoor temperature threshold; and
a fourth parameter indicating an actual outdoor temperature.

8. The method of claim 7, wherein selecting, by the control system, between operation of the furnace and the heat pump comprises selecting the heat pump in response to the cost savings being greater than the cost savings threshold and the actual outdoor temperature being less than the outdoor temperature threshold.

9. The method of claim 1, wherein determining, by the control system, the application balance point temperature comprises periodically collecting building data, computing the rate of heat loss of the structure based on the building data, and determining the application balance point temperature based on the rate of heat loss of the structure.

10. The method of claim 9, wherein determining, by the control system, the application balance point temperature further comprises periodically collecting heat pump data, computing the heating capacity of the heat pump, and determining the application balance point temperature based on the rate of heat loss of the structure and further based on the heating capacity of the heat pump.

11. The method of claim 10, wherein computing the rate of heat loss of the structure comprises:
plotting two or more heat loss rate and temperature points based on the building data; and
determining, based on the two or more heat loss rate and temperature points, a heat loss trend line of the structure;
wherein computing the heating capacity of the heat pump comprises:
plotting two or more heat capacity and temperature points based on the heat pump data; and
determining, based on the two or more heat capacity and temperature points, a heat capacity trend line of the heat pump.

12. The method of claim 11, further comprising:
receiving a user temperature setpoint for a space heated by the heat pump and the furnace;
determining a heat loss rate at the user temperature setpoint; and
setting one of the two or more heat loss rate and temperature points as the heat loss rate at the user temperature setpoint.

13. The method of claim 12, wherein determining, by the control system, the application balance point temperature comprises identifying an intersection temperature where the heat loss trend line and the heat capacity trend line intersect.

14. A control system comprising a processing circuit configured to control a furnace and a heat pump, wherein the processing circuit is configured to:
receive cost data for at least one of electricity to operate the heat pump or fuel to operate the furnace;
determine an economic balance point temperature based on the cost data;
calculate an application balance point temperature below which a heating capacity of the heat pump is less than a rate of heat loss of a structure; wherein,
the application balance point temperature is calculated based on correlating heat loss trend data and heat capacity trend data;
receive user input indicative of a selected balance between comfort and financial savings; and
select between operation of the furnace and the heat pump based on the user input, the economic balance point temperature, and the application balance point temperature.

15. The control system of claim 14, wherein the processing circuit is configured to determine an actual balance point temperature based on the economic balance point temperature, the application balance point temperature, and the user input;
wherein the processing circuit is configured to select between operation of the furnace and the heat pump is based on the actual balance point temperature.

16. The control system of claim 14, wherein the processing circuit is configured to receive a user temperature setpoint for a space heated by the heat pump and the furnace;
wherein the processing circuit is configured to determine the application balance point temperature is based on the user temperature setpoint.

17. The control system of claim 14, wherein the processing circuit is configured to:
receive a static balance point and an indication to override a selection algorithm for selecting operation of the furnace and the heat pump; and
select between operation of the furnace and the heat pump based on the static balance point in response to a determination that the indication to override the selection algorithm is received.

18. The control system of claim 14, wherein the processing circuit is configured to:
compare the economic balance point temperature to the application balance point temperature;
select between operation of the furnace and the heat pump based on the economic balance point temperature and not based on the application balance point temperature in response to a first determination that the economic balance point temperature is greater than the application balance point temperature; and
select between operation of the furnace and the heat pump based on the application balance point temperature and not based on the economic balance point temperature in response to a second determination that the application balance point temperature is greater than the economic balance point temperature.

19. The control system of claim 14, wherein the user input defines a conditional rule comprising one or more parameters;
wherein the processing circuit is configured to select between operation of the furnace and the heat pump by:
determining whether the conditional rule is triggered; and
selecting between operation of the furnace and the heat pump based on the conditional rule being triggered.

20. The control system of claim 14, wherein determining, by the control system, the application balance point temperature comprises periodically collecting building data, computing the rate of heat loss of the structure based on the building data, and determining the application balance point temperature based on the rate of heat loss of the structure.

21. The control system of claim 20, wherein determining, by the control system, the application balance point temperature further comprises periodically collecting heat pump data, computing the heating capacity of the heat pump, and determining the application balance point temperature based on the rate of heat loss of the structure and further based on the heating capacity of the heat pump.

22. A computer readable storage medium comprising instructions stored thereon that, when executed by one or more processing circuits, include operations for controlling a furnace and a heat pump, the operations comprising:
receiving cost data for at least one of electricity to operate the heat pump or fuel to operate the furnace;
determining an economic balance point temperature based on the cost data;
calculate an application balance point temperature below which a heating capacity of the heat pump is less than a rate of heat loss of a structure; wherein,
the application balance point temperature is calculated based on correlating heat loss trend data and heat capacity trend data;
receiving user input indicative of a selected balance between comfort and financial savings; and
selecting between operation of the furnace and the heat pump based on the user input, the economic balance point temperature, and the application balance point temperature.

23. The computer readable storage medium of claim 22, wherein the operations further comprise determining an actual balance point temperature based on the economic balance point temperature, the application balance point temperature, and the user input;
wherein selecting between operation of the furnace and the heat pump is based on the actual balance point temperature.

* * * * *